United States Patent
Aditya et al.

(10) Patent No.: US 11,593,729 B2
(45) Date of Patent: Feb. 28, 2023

(54) COGNITIVE TUNING OF SCHEDULING CONSTRAINTS

(71) Applicant: International Business Machines Corporation, Armonk, NY (US)

(72) Inventors: Akhouri Abhinav Aditya, Jharkhand (IN); Sathwik Chenna Madhavuni, Jersey City, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 112 days.

(21) Appl. No.: 16/818,399

(22) Filed: Mar. 13, 2020

(65) Prior Publication Data

US 2021/0287157 A1    Sep. 16, 2021

(51) Int. Cl.
*G06Q 10/06* (2012.01)
*G06Q 10/0631* (2023.01)
*G06Q 10/0639* (2023.01)

(52) U.S. Cl.
CPC ........ *G06Q 10/063118* (2013.01); *G06Q 10/06312* (2013.01); *G06Q 10/06393* (2013.01); *G06Q 10/063116* (2013.01)

(58) Field of Classification Search
None
See application file for complete search history.

(56) References Cited

U.S. PATENT DOCUMENTS 7,424,451 B1 * 9/2008 Moore ............... G06Q 10/02
  705/35
10,498,897 B1 * 12/2019 Chadha ............. H04M 3/5232
(Continued)

FOREIGN PATENT DOCUMENTS

AU    2019201079 A1    3/2019
CN    110211379 A      9/2019
(Continued)

OTHER PUBLICATIONS

Dahmen, "Solving multi-activity multi-day shift scheduling problems with a hybrid heuristic," 2015, Journal of Scheduling, vol. 18, pp. 207-223 (Year: 2015).*
(Continued)

*Primary Examiner* — Ivan R Goldberg
(74) *Attorney, Agent, or Firm* — Garg Law Firm, PLLC; Rakesh Garg; Christopher Pignato

(57) ABSTRACT

An embodiment includes parsing form data into a plurality of form values received with a schedule request and assembling the form values into a search vector. The embodiment searches historical data using a nearest neighbor algorithm that inputs the search vector and identifies first and second sets of historical vectors comprising that are closest by Euclidean distance to the search vector. The embodiment calculates an enhanced constraint vector comprising an average value based at least in part on the first set of historical vectors and a standard deviation value based at least in part on the second set of historical vectors. The
(Continued)

embodiment generates an employee schedule using an optimization algorithm subject to a plurality of schedule constraints that include the enhanced constraint vector. The embodiment then transmit data for initiating a notification regarding availability of the employee schedule.

18 Claims, 9 Drawing Sheets

(56) References Cited

U.S. PATENT DOCUMENTS

| | | | |
|---|---|---|---|
| 2014/0156323 A1* | 6/2014 | Prieto | G06Q 50/08 705/7.12 |
| 2015/0121058 A1* | 4/2015 | Gebhart | G06Q 10/063116 713/100 |
| 2015/0242819 A1 | 8/2015 | Moses et al. | |
| 2017/0083841 A1* | 3/2017 | Syrichas | G06Q 10/06311 |
| 2017/0083873 A1* | 3/2017 | Syrichas | G06N 5/003 |
| 2017/0140325 A1* | 5/2017 | Syrichas | G06Q 10/063116 |
| 2018/0322462 A1 | 11/2018 | Jayaraman et al. | |
| 2019/0278529 A1 | 9/2019 | Yeung et al. | |

FOREIGN PATENT DOCUMENTS

| | | |
|---|---|---|
| CN | 110555572 A | 12/2019 |
| WO | 2020015830 A1 | 1/2020 |

OTHER PUBLICATIONS

Xu, Industrial Strength Compass: A Comprehensive Algorithm and Software for Optimization via Simulation, 2010, ACM Transactions on Modeling, and Computer Simulation, vol. 20, No. 1, pp. 1-29 (Year: 2010).*

Meignan, "A neutrality-based iterated local search for shift scheduling optimization and interactive reoptimization," 2019, European Journal of Operational Research, vol. 279, pp. 320-334 (Year: 2019).*

Huang, "Accurate and Fast Asymetric Locality-Sensitive Hashing Scheme for Maximum Inner Product Search," 2018, In Proceedings of the 24th ACM SIGKDD International Conference on Knowledge Discovery & Data Mining, pp. 156-1570 (Year: 2018).*

Andoni, Near-Optimal Hashing Algorithms for Approximate Nearest Neighbor in High Dimensions, 2008, Communications of the ACM, vol. 51, No. 1, pp. 117-122 (Year: 2008).*

Datar, Locality-Sensitive Hashing Scheme based on p-Stable Distributions, 2004, ACM, In Proceedings of the Twentieth Annual symposium on Computational Geometry, pp. 253-262 (Year: 2004).*

* cited by examiner

STAFFING MIX IN PERCENTAGE OF ASSOCIATES:
BEST POSSIBLE STAFFING MIX WITH CURRENT STAFFING LEVEL

| SHIFT | GRADE | MON | TUE | WED | THU | FRI | SAT | SUN |
|---|---|---|---|---|---|---|---|---|
| EARLY MORNING | GRADE 63 | 51% | 56% | 54% | 51% | 52% | 56% | 36% |
|  | GRADE 62 | 33% | 28% | 31% | 34% | 31% | 30% | 39% |
|  | GRADE 61 | 16% | 15% | 15% | 15% | 18% | 13% | 25% |
|  | GRADE 60 | 0% | 0% | 0% | 0% | 0% | 0% | 0% |
| MID MORNING | GRADE 63 | 40% | 40% | 41% | 43% | 43% | 41% | 21% |
|  | GRADE 62 | 28% | 28% | 28% | 28% | 28% | 26% | 35% |
|  | GRADE 61 | 24% | 24% | 23% | 22% | 23% | 28% | 28% |
|  | GRADE 60 | 7% | 8% | 8% | 6% | 6% | 5% | 15% |
| LATER MORNING | GRADE 63 | 26% | 19% | 26% | 27% | 27% | 28% | 20% |
|  | GRADE 62 | 32% | 35% | 28% | 19% | 21% | 24% | 33% |
|  | GRADE 61 | 35% | 37% | 38% | 45% | 48% | 47% | 36% |
|  | GRADE 60 | 8% | 9% | 7% | 9% | 4% | 1% | 11% |
| AFTERNOON | GRADE 63 | 33% | 34% | 34% | 34% | 35% | 21% | 19% |
|  | GRADE 62 | 28% | 28% | 26% | 30% | 26% | 38% | 31% |
|  | GRADE 61 | 39% | 38% | 40% | 37% | 39% | 42% | 50% |
|  | GRADE 60 | 0% | 0% | 0% | 0% | 0% | 0% | 0% |
| EVENING | GRADE 63 | 16% | 16% | 16% | 16% | 15% | 16% | 13% |
|  | GRADE 62 | 28% | 30% | 26% | 28% | 31% | 34% | 17% |
|  | GRADE 61 | 43% | 44% | 43% | 41% | 40% | 39% | 43% |
|  | GRADE 60 | 12% | 10% | 16% | 15% | 14% | 11% | 26% |

| RECOMMENDATION | RANGE | EXPECTED PREFERENCES ALIGNED | RANGE | IMPROVEMENT |
|---|---|---|---|---|
| AVERAGE BREAK TIME PER ASSOCIATE PER DAY | 28 – 29 MINUTES | EARLY MORNING | 15% - 22% | 0% - 3% |
| AVERAGE LUNCH TIME PER ASSOCIATE PER DAY | 26 – 33 MINUTES | MID MORNING | 38% - 42% | 0% |
| AVERAGE MEETING TIME PER ASSOCIATE PER DAY | 29 – 35 MINUTES | LATER MORNING | 20% - 24% | 0% |
| AVERAGE OVERTIME TIME PER DAY | 15 – 47 HOURS | AFTERNOON | 17% - 22% | 7% - 12% |
| AVERAGE TRAINING TIME PER DAY | 12 – 36 HOURS | EVENING | 10% - 14% | 3% - 7% |
| AVERAGE TOTAL PAID LEAVE TIME PER PAY PERIOD | 4391 – 5844 HOURS | | | |

IDEAL STAFFING MIX
GRADE 63 ASSOCIATES

| SHIFT | MON (88% - 100%) | TUE (86% - 97%) | WED (88% - 100%) | THU (87% - 99%) | FRI (85% - 96%) | SAT (61% - 70%) | SUN (17% - 20%) |
|---|---|---|---|---|---|---|---|
| EARLY MORNING | 48-55 (27%-31%) | 52-59 (30%-34%) | 53-60 (30%-34%) | 53-60 (30%-34%) | 50-57 (28%-34%) | 30-34 (25%-28%) | 10-11 (28%-31%) |
| MID MORNING | 71-81 (40%-46%) | 68-78 (40%-45%) | 70-80 (40%-45%) | 68-78 (39%-45%) | 69-79 (41%-46%) | 60-69 (49%-56%) | 10-11 (28%-31%) |
| LATER MORNING | 24-27 (14%-15%) | 15-17 (9%-10%) | 21-24 (12%-14%) | 18-20 (10%-11%) | 19-21 (11%-12%) | 21-24 (17%-20%) | 9-10 (26%-28%) |
| AFTERNOON | 22-25 (12%-14%) | 26-29 (15%-17%) | 21-24 (12%-14%) | 24-27 (14%-15%) | 22-25 (13%-15%) | 5-6 (4%-5%) | 3-4 (9%-11%) |
| EVENING | 11-12 (6%-7%) | 11-12 (6%-7%) | 11-12 (6%-7%) | 12-13 (7%-8%) | 10-11 (6%-7%) | 6-7 (5%-6%) | 3-4 (9%-11%) |
| TOTAL | 176-200 | 172-195 | 176-200 | 175-198 | 170-193 | 122-140 | 35-40 |

GRADE 62 ASSOCIATES

| SHIFT | MON (74% - 84%) | TUE (71% - 82%) | WED (68% - 77%) | THU (67% - 76%) | FRI (63% - 71%) | SAT (47% - 52%) | SUN (26% - 29%) |
|---|---|---|---|---|---|---|---|
| EARLY MORNING | 31-35 (21%-23%) | 27-31 (19%-22%) | 31-35 (23%-26%) | 35-40 (26%-30%) | 30-34 (24%-27%) | 16-18 (17%-19%) | 11-12 (21%-23%) |
| MID MORNING | 50-57 (34%-38%) | 47-54 (33%-38%) | 48-55 (35%-40%) | 45-51 (33%-38%) | 45-51 (36%-40%) | 38-43 (40%-46%) | 17-19 (33%-37%) |
| LATER MORNING | 29-33 (19%-22%) | 27-31 (19%-22%) | 23-26 (17%-19%) | 13-14 (10%-11%) | 15-17 (12%-13%) | 18-20 (19%-21%) | 15-17 (28%-33%) |
| AFTERNOON | 19-21 (13%-14%) | 21-24 (15%-17%) | 16-18 (12%-13%) | 21-24 (16%-18%) | 16-18 (13%-14%) | 9-10 (10%-11%) | 5-6 (10%-12%) |
| EVENING | 20-23 (13%-15%) | 21-24 (15%-17%) | 18-20 (13%-15%) | 21-24 (16%-18%) | 20-23 (16%-18%) | 13-14 (14%-15%) | 4-5 (8%-10%) |
| TOTAL | 149-169 | 143-164 | 136-154 | 135-153 | 126-143 | 94-105 | 52-59 |

*FIGURE 9*

| 900 OVERALL PREFERENCES MET RESULTS: FOLLOWING PREFERENCES HAVE BEEN MET | |
|---|---|
| WEEKENDS | NUMBER OF ASSOCIATES |
| PREFERRED | 181 |
| SCHEDULED | 103 |
| PREFERENCES ALIGNED | 56% |
| SHIFT | NUMBER OF ASSOCIATES |
| EARLY MORNING | |
| PREFERRED | 292 |
| SCHEDULED | 154 |
| PREFERENCES ALIGNED | 53% |
| MID MORNING | |
| PREFERRED | 359 |
| SCHEDULED | 231 |
| PREFERENCES ALIGNED | 64% |
| LATER MORNING | |
| PREFERRED | 119 |
| SCHEDULED | 69 |
| PREFERENCES ALIGNED | 57% |
| AFTERNOON | |
| PREFERRED | 49 |
| SCHEDULED | 18 |
| PREFERENCES ALIGNED | 37% |
| EVENING | |
| PREFERRED | 23 |
| SCHEDULED | 16 |
| PREFERENCES ALIGNED | 70% |

COGNITIVE TUNING OF SCHEDULING CONSTRAINTS

BACKGROUND

The present invention relates generally to a method, system, and computer program product for generating employee work schedules. More particularly, the present invention relates to a method, system, and computer program product for cognitive tuning of scheduling constraints.

One of several standard management tasks is to prepare and disperse employee work schedules. In many cases, employees are assigned fixed recurring work schedules that rarely change. In other cases, employees have schedules that change from time to time, for example on a daily or weekly basis. Changes to work schedules may include changes to the days, hours, or locations assigned to employees. For example, field service technicians may work in different locations daily according to work orders they are assigned. Other employees, such as call center agents, are assigned shift times that vary from time to time. In such cases, managers are tasked with preparing work schedules on a regular basis. Managers must carefully prepare such schedules to match projected demand and accommodate employee schedule requests to the extent possible. As a result, the task of preparing work schedules can be a challenging and time-consuming process.

SUMMARY

The illustrative embodiments provide for cognitive tuning of scheduling constraints. An embodiment includes parsing, responsive to a schedule request from a user, form data into a plurality of form values the schedule request comprising the form data from an electronic form populated by the user. The embodiment also includes assembling the form values into a search vector. The embodiment also includes searching historical data in a history database using a nearest neighbor algorithm that inputs the search vector, identifies a first set of historical vectors comprising a first predetermined number of historical vectors that are closest by Euclidean distance to the search vector, and identifies a second set of historical vectors comprising a second predetermined number of historical vectors that include the first set of historical vectors and are most similar by Euclidean distance to the search vector. The embodiment also includes calculating an enhanced constraint vector comprising an average value based at least in part on the first set of historical vectors and a standard deviation value based at least in part on the second set of historical vectors. The embodiment also includes generating an employee schedule using an optimization algorithm subject to a plurality of schedule constraints, wherein the plurality of schedule constraints comprises the enhanced constraint vector. The embodiment also includes transmitting, responsive to the generating of the employee schedule, data for initiating a notification regarding availability of the employee schedule. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 7 depicts a non-limiting example of a schedule report output from a schedule management application in accordance with an illustrative embodiment;

FIG. 8 depicts a non-limiting example of a schedule report output from a schedule management application in accordance with an illustrative embodiment; and FIG. 9 depicts a non-limiting example of a schedule report output from a schedule management application in accordance with an illustrative embodiment.

DETAILED DESCRIPTION

Figure 1:
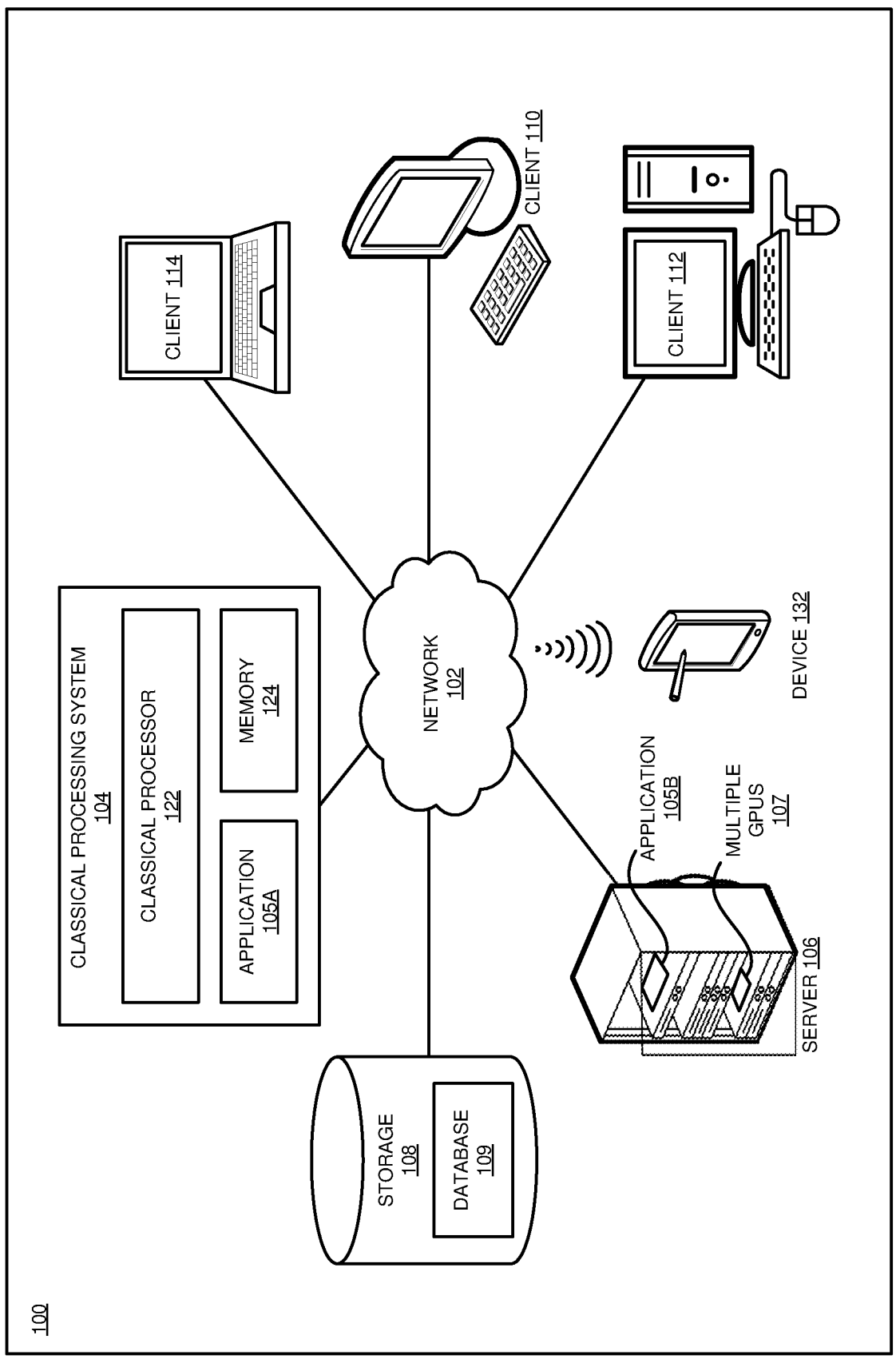
FIG. 1 depicts a block diagram of a network of data processing systems in which illustrative embodiments may be implemented.

In many businesses or other such organizations that have employees that work varying work schedules, managers are tasked with preparing such work schedules on a regular basis. Preparing such work schedules may be a time-intensive task prone to human error, particularly in larger organizations having many employees that work varying schedules that may involve multiple shifts, locations, departments, or other constraints. In many situations, the number of constraints and employees involved make it impractical for managers or other personnel to manually create such work schedules that properly account for all desired constraints that might include, in addition to employee and shift constraints, further constrains related to projected demand and key performance indicators (KPIs).

The present embodiments recognize that, due to the complexity of preparing employee work schedules that account for such large numbers of constraints, many of the desired constraints are not implemented, enforced or accounted for when such schedules must be manually created. Therefore, present embodiments leverage machine-learning technology to prepare schedules that are optimized for a large number of constraints that would otherwise be impractical or nearly impossible for a person to manually create without the aid of artificial intelligence systems.

The present embodiments also recognize that machine-learning algorithms used to prepare a work schedule based on given constraints will output a result that reflects the quality of the input constraints. The present embodiments further recognize that the quality of the input constraints is improved if it includes historical scheduling information that includes past schedules and the results associated with those past schedules. For example, in some embodiments, historical scheduling information is provided in a history database that includes past schedules and performance and satisfaction information associated with each of the past schedules, such as employee idle time and customer satisfaction rate, that indicates how well each schedule worked. The present embodiments recognize machine-learning algorithms that receive improved constraints and other input information such as the historical data provide more optimal scheduling results.

According to some embodiments, a schedule management application is provided a set of pre-defined business constraints to execute a machine learning driven search on the historical data. The search results are combined with other pre-defined constraints that are generally defined around the business decision variables. In some embodiments, these constraints in optimal scheduling problems range from minimal number of shifts, minimum hours per week, to maximum number of employees in a shift. In some embodiments, the application collects a multitude of historical data points, including number of scheduled workers present during certain shifts and the business outcome for these certain shifts, for example idle time and customer satisfaction rate.

In an illustrated embodiment, a schedule management application gathers historical data, including data pertaining to associate attributes such as past performance and productivity. In some embodiments, a schedule management application identifies target business KPIs as decision variables. In some such embodiments, a schedule management application combines such decision variables with pre-defined constraints to create a search vector, and feeds the search vector into a nearest-neighbor search algorithm. In some embodiments, the schedule management application aggregates the historical data at the level of each region/location and data is engineered to create features that resemble pre-defined constraints, such as a total number of a particular pay grade employees in a shift.

In some embodiments, a schedule management application includes a nearest-neighbor search algorithm that runs on the engineered features for each region/location to find a threshold number of feature vectors that are most similar as per Euclidean distance, to the search vector. In some embodiments, the threshold number of feature vectors is selected based on the anticipated output variance. For example, in some embodiments, the threshold number corresponds to a desired sample size, N, required for a desired accuracy. In some such embodiments, it is anticipated that the output bit-stream still retains its Binomial distribution, so the output probability distribution will assume a Gaussian distribution as determined by the Central Limit Theorem in statistics.

In an illustrated embodiment, a schedule management application receives a schedule request from a user. In some embodiments, the schedule request is an employee work schedule request for one or more employees. In some embodiments, the schedule request is an employee work schedule request for employees in a plurality of geographical regions, office locations, building subdivisions, departments, and/or other groupings.

In an illustrated embodiment, a schedule management application receives a schedule request from a user that includes form data from an electronic form populated by the user and, responsive to receiving the request, the schedule management application parses the form data into a plurality of form values. In some such embodiments, the schedule management application assembles the form values into a search vector. In some embodiments, the form data includes data regarding one or more employees. In some embodiments, the form data includes data regarding one or more employees in a plurality of geographical regions, office locations, building subdivisions, departments, and/or other groupings. In some embodiments, the form data includes data regarding a demand value representative of a projected business demand during the specified schedule period. In some embodiments, the form data includes data regarding a key performance indicator (KPI) value representative of a target business goal for the specified schedule period. In some embodiments, the form data includes data regarding a first number of employees available to work during a specified schedule period. In some embodiments, the form data includes data regarding a second number of employees available to work during the specified schedule period, wherein the first and second numbers correspond to respective employee categories. In some embodiments, the form data includes schedule preference data representative of a schedule preference of an employee.

In an illustrated embodiment, a schedule management application assembles data received in connection with a schedule request into a search vector. In some embodiments, the search vector includes a plurality of dimensions corresponding to respective constraints from the data received in connection with the schedule request. In some embodiments, the search vector includes dimensions corresponding to one or more of a business demand, an employee availability, a KPI and/or an employee schedule preference.

In an illustrated embodiment, a schedule management application searches historical data in a history database for historical data that can be used to optimize constraints for a machine-learning scheduling system. In some embodiments, the schedule management application uses a nearest neighbor algorithm to search the historical data. In some embodiments, the nearest neighbor algorithm inputs the search vector, identifies a first set of historical vectors comprising a first predetermined number of historical vectors that are closest by Euclidean distance to the search vector, and identifies a second set of historical vectors comprising a second predetermined number of historical vectors that include the first set of historical vectors and are most similar by Euclidean distance to the search vector. In some embodiments, the schedule management application uses locality sensitive hashing for the nearest neighbor search if the number of constraints exceeds a threshold number. For example, in some such embodiments, the schedule management application uses locality sensitive hashing for the nearest neighbor search if the number of constraints exceeds 30. In some embodiments, the schedule management application uses locality sensitive hashing for the nearest neighbor search if the number of constraints exceeds a threshold number at which an amount of time and/or other resources to complete the nearest neighbor search becomes undesirable.

In some embodiments, prior to searching the historical data, a schedule management application preprocesses the historical data in the history database based at least in part on the form values in the search vector. In some embodiments, the schedule management application performs preprocessing that includes one or more preprocessing functions, such as format conversion, amplitude normalization, phase shifting, frequency weighting, blanking, summation, and filtering. For example, in some embodiments, the schedule management application normalizes the historical data in the history database based at least in part on the form values in the search vector. In some embodiments, the schedule management application structures the historical data in the history database to form a plurality of historical schedule vectors. In some embodiments, the schedule management application arranges the historical data in the history database into data structures each having a number of dimensions corresponding to dimensions of the search vector.

In some embodiments, a schedule management application calculates an enhanced constraint vector comprising an average value based at least in part on the first set of historical vectors and a standard deviation value based at least in part on the second set of historical vectors. As a non-limiting example, in some embodiments, each of the historical vectors in the first set of historical vectors has n vector elements. The schedule management application averages the corresponding vector elements 1 through n of the first set of historical vectors, resulting in a set of n average values. The schedule management application then uses the set of n average values as vector elements 1 through n of the enhanced constraint vector.

In some embodiments, a schedule management application calculates an enhanced constraint vector comprising n average values corresponding to respective averages of elements 1 through n of the first set of historical vectors. In some embodiments, the schedule management application also calculates n standard deviation values. In some embodiments, the schedule management application calculates the n standard deviation values using the second set of historical vectors. In some embodiments, the schedule management application calculates the n standard deviation values using the second set of historical vectors. In some embodiments, the schedule management application calculates the n standard deviation values based on respective values of elements 1 through n of the second set of historical vectors. In some embodiments, the schedule management application applies the n standard deviation values to the n average values such that each of the 1 through n standard deviation values is applied to respective averages 1 through n of the enhanced constraint vector.

In some embodiments, a schedule management application generates an employee schedule using an optimization algorithm subject to a plurality of schedule constraints. In some embodiments, the schedule management application generates an employee schedule using an optimization algorithm subject to a plurality of schedule constraints that include the enhanced constraint vector. In some embodiments, the schedule management application generates an employee schedule using an optimization algorithm subject to a plurality of schedule constraints that include the enhanced constraint vector and one or more of a number of employees in each shift, a number of shifts an employee can be assigned, a number of days in the schedule, a number of shifts in a schedule, a number of full-time schedules, a number of part time schedules, an employee that must work the same shift as a supervisor, and rotational weekend information.

In some embodiments, a schedule management application transmits data for initiating a notification regarding availability of the employee schedule. In some embodiments, the schedule management application transmits the data for initiating the notification regarding availability of the employee schedule after the employee schedule has been generated. In some embodiments, the schedule management application transmits the data for initiating the notification regarding availability of the employee schedule automatically in response to the generating of the employee schedule. In some embodiments, the data for initiating a notification regarding availability of the employee schedule includes any kind of signal transmitted to another module or system that is local to, or remotely from located from, the schedule management application.

In an illustrative embodiment, a schedule management application collects pre-defined business constraints. As a non-limiting example provided for clarity purposes, a schedule management application collects demand (d1), available resources by pay-grade for four pay-grades (x1, x2, x3, x4) and the required business KPIs (kpi1, kpi2, kpi3). In this example, the search vector would be an eight-dimensional vector with these eight values. The schedule management application in this example normalizes and structures data from the historical scheduling data to extract such eight-dimensional vectors for each historical schedule. Once the historical space is defined, the search vector is input into a cognitive search algorithm. The schedule management application in this example initiates a 30 (min number; no max) unit nearest-neighbor search of the historical data. The search vector is consumed as the input into the nearest-neighbor algorithm and the schedule management application identifies the nearest three and thirty historical vectors within the space. Then, the schedule management application takes the average of nearest three vectors as a mean value and the standard deviation of nearest thirty vectors is taken as standard deviation. Thirty vectors are selected to meet the minimal sample size per Central Limit Theorem where, for this example, the vectors are arranged as shown in expression (1) below.

$$\begin{aligned}\text{result\_vector}=[&\text{result\_}d1\_\text{mean}+std(\text{result\_}d1),\\&\text{result\_}x1\_\text{mean}\pm std(\text{result\_}x1),\\&\text{result\_}x2\_\text{mean}\pm std(\text{result\_}x2),\\&\text{result\_}x3\_\text{mean}\pm std(\text{result\_}x3),\\&\text{result\_}x4\_\text{mean}\pm std(\text{result\_}x4),\\&\text{result\_}kpi1\_\text{mean}\pm std(\text{result\_}kpi1),\\&\text{result\_}kpi2\_\text{mean}\pm std(\text{result\_}kpi3),\\&\text{result\_}kpi3\_\text{mean}\pm std(\text{result\_}kpi3)] \end{aligned} \quad (1)$$

For this example, the results x1-x4 variables represent the number of workers by pay-grade needed for each region/location. These results from the optimal number of resources for the given demand d1 of this example. The results kpi1-kpi3 form the expected KPI values that can be achieved in this example when resources are utilized as per results x1-x4. The result vector (1) is used in this example to create dynamic constraints. The constraints are then fed into an optimization model.

In some embodiments, the schedule management application inputs into the optimization model, in addition to the dynamic constraints, several additional business constraints like number of associates in each shift, number of shifts an associate can be assigned, number of days in the schedule, number of shifts in a schedule, number of full-time schedules, number of part time schedules, associate in the same shift as a supervisor, and rotational weekends. In some embodiments, the schedule management application feeds scheduling preferences of associates into the optimization model to ensure that the model not only considers the business and dynamic constraints, but also takes into account the associates' preferences. In some embodiments, the objective for the optimization model is to meet the given business demand, maximize meeting of associate preferences, and to minimize the total cost. In some embodiments, the optimization algorithm runs a combinatorial problem in dimensions comprising these variables and reaches an optimal point in the embedded space which gives the minimal objective value, subject to the constraints set that has been given, and outputs the optimal point as the final solution. In some embodiments, once the model reaches an optimal solution, the schedule management application captures the state of the model and records the variable space. In some embodiments, the schedule management application then articulates the result as individual schedules for associates and also as regional and national schedules for all associates in the organization.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
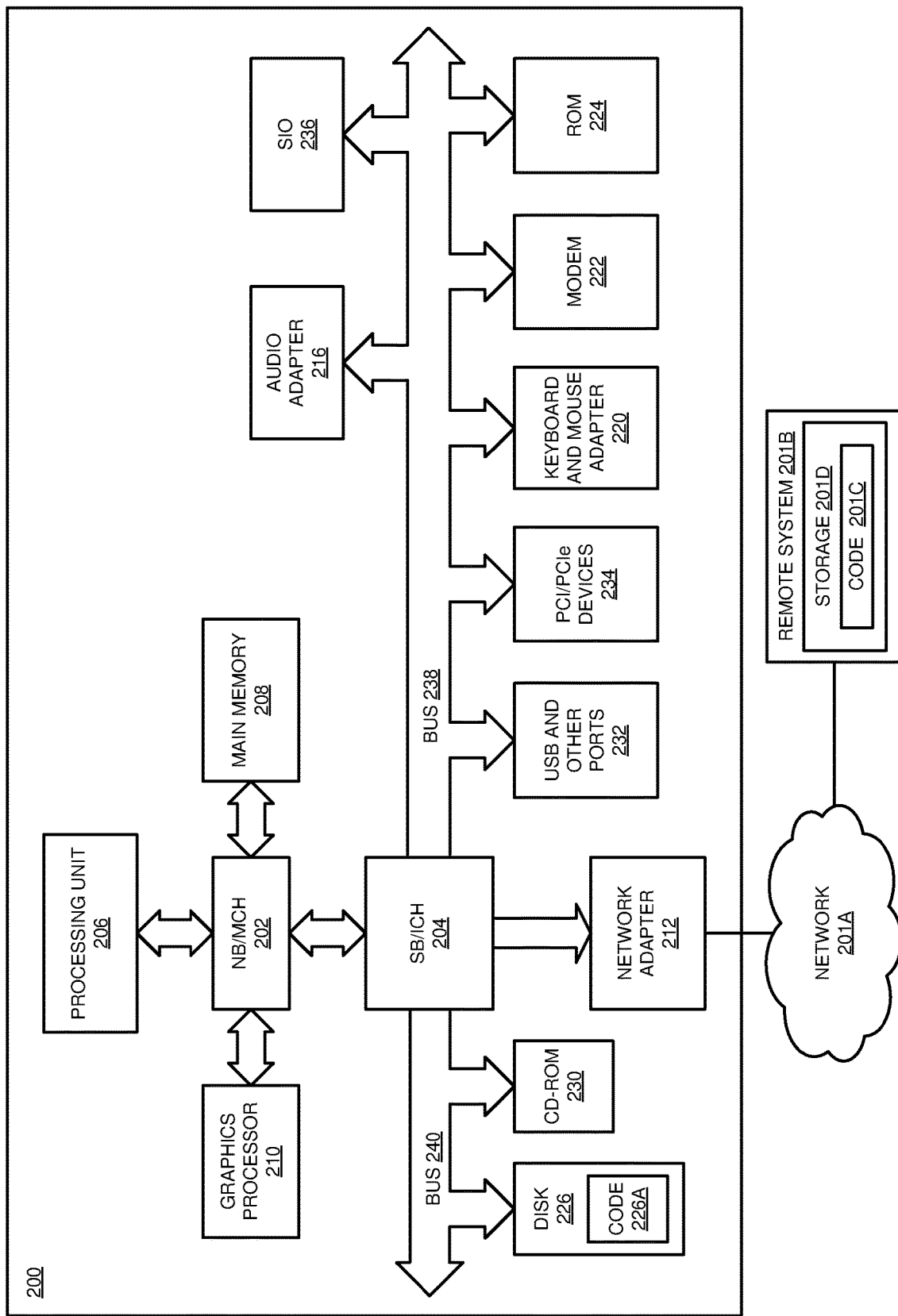
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes neural network application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by neural network application 105B such as initiating processes described herein of the neural network. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In an embodiment, one or more of neural network application 105A of data processing system 104 and neural network application 105B of server 106 implements an embodiment of a neural network, such as a DNN, as described herein. In a particular embodiment, the neural network is implemented using one of network application 105A and network application 105B within a single server or processing system. In another particular embodiment, the neural network is implemented using both network application 105A and network application 105B within a single server or processing system. Server 106 includes multiple GPUs 107 including multiple nodes in which each node may include one or more GPUs as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202.* Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
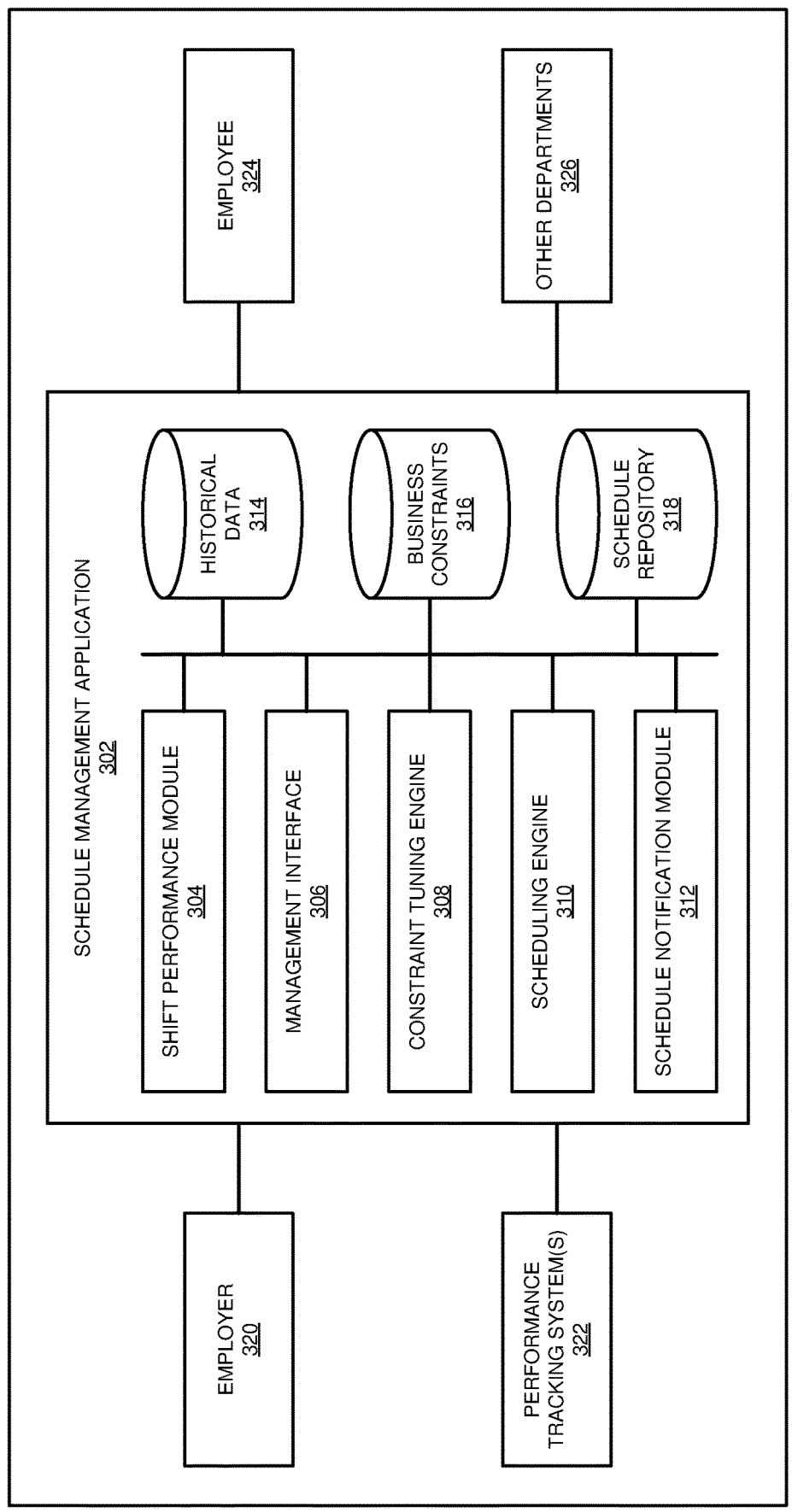
FIG. 3 depicts a block diagram of an example schedule management application 302 in accordance with an illustrative embodiment.

With reference to FIG. 3, this figure depicts a block diagram of an example schedule management application 302 in accordance with an illustrative embodiment. In a particular embodiment, application 302 is an example of application 105A/105B of FIG. 1.

In some embodiments, the schedule management application 302 includes a shift performance module 304, a management interface 306, a constraint tuning engine 308, a scheduling engine 310, and a schedule notification module 312 that read and write data to one or more databases for historical data 314, business constraint data 316, and a schedule repository 318. In alternative embodiments, the schedule management application 302 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the shift performance module 304 generates performance data and stores it with historical data 314. In some embodiments, the shift performance module 304 receives input from an employer 320, such as manual input provided by management personnel. In some embodiments, the shift performance module 304 receives input from one or more processor-based performance tracking systems 322. In some embodiments, the shift performance module 304 receives input data related to one or more performance metrics indicative of how well employees or groups of employees performed during their shifts. In some embodiments, the shift performance module 304 associates this performance information with corresponding schedule information as part of the historical data 324.

In some embodiments, the management interface 306 provides a portal for users to interact with the application 302. For example, in some embodiments, the management interface 306 generates a portal that allows users to input performance information for the shift performance module 304, input pre-defined constraint values for the constraint tuning engine 308 or for storage with business constraint data 316, and/or input schedule requests for the scheduling engine 310.

In some embodiments, the constraint tuning engine 308 receives a schedule request from a user that includes form data from an electronic form populated by the user and, responsive to receiving the request, the schedule management application parses the form data into a plurality of form values. In some such embodiments, the constraint tuning engine 308 assembles the form values into a search vector. In some embodiments, the constraint tuning engine 308 searches history database 314 for historical data that can be used to optimize constraints for a machine-learning scheduling system. In some embodiments, the constraint tuning engine 308 uses a nearest neighbor algorithm to search the historical data 314. In some embodiments, the nearest neighbor algorithm inputs the search vector, identifies a first set of historical vectors comprising a first predetermined number of historical vectors that are closest by Euclidean distance to the search vector, and identifies a second set of historical vectors comprising a second predetermined number of historical vectors that include the first set of historical vectors and are most similar by Euclidean distance to the search vector. In some embodiments, the constraint tuning engine 308 uses locality sensitive hashing for the nearest neighbor search if the number of constraints exceeds a threshold number. In some embodiments, the constraint tuning engine 308 calculates an enhanced constraint vector comprising an average value based at least in part on the first set of historical vectors and a standard deviation value based at least in part on the second set of historical vectors. In some embodiments, the constraint tuning engine 308 provides the enhanced constraint vector to the scheduling engine 310.

In some embodiments, prior to searching the historical data, the constraint tuning engine 308 preprocesses the historical data in the history database based at least in part on the form values in the search vector. In some embodiments, the constraint tuning engine 308 performs preprocessing that includes one or more preprocessing functions, such as format conversion, amplitude normalization, phase shifting, frequency weighting, blanking, summation, and filtering.

In some embodiments, the scheduling engine 310 generates an employee schedule using an optimization algorithm subject to a plurality of schedule constraints. In some embodiments, the scheduling engine 310 generates an employee schedule using an optimization algorithm subject to a plurality of schedule constraints that include the enhanced constraint vector from the constraint tuning engine 308. In some embodiments, the scheduling engine 310 generates an employee schedule using an optimization algorithm subject to a plurality of schedule constraints that include the enhanced constraint vector and one or more of a number of employees in each shift, a number of shifts an employee can be assigned, a number of days in the schedule, a number of shifts in a schedule, a number of full-time schedules, a number of part time schedules, an employee that must work the same shift as a supervisor, and rotational weekend information. In some embodiments, the scheduling engine 310 notifies the schedule notification engine 312 when the schedule is completed. In some embodiments, the scheduling engine 310 stores the completed schedule in the schedule repository 318. In some embodiments, the scheduling engine 310 stores the completed schedule with the historical data 314 where the shift performance module 304 can later associate it with shift performance data.

In some embodiments, the schedule notification engine 312 transmits data for initiating a notification regarding availability of the employee schedule in the schedule repository 318. In some embodiments, the schedule notification engine 312 transmits data for initiating a notification to an employee 324 or department 326 that, in turn, issues notifications to employees regarding the availability of the new work schedule. In some embodiments, the schedule notification engine 312 notifies one or more employees 324 and/or other departments 326 directly regarding the availability of the new schedule, for example payroll and/or human resources. In some embodiments, the schedule notification engine 312 notifies one or more employees 324 and/or other departments 326, for example payroll and/or human resources. In some embodiments, the schedule management application transmits the data for initiating the notification regarding availability of the employee schedule after the employee schedule has been generated. In some embodiments, the schedule notification engine 312 transmits the data for initiating the notification regarding availability of the employee schedule automatically in response to the generating of the employee schedule. In some embodiments, the data for initiating a notification regarding availability of the employee schedule includes any kind of signal transmitted to another module or system that is local to, or remotely from located from, the schedule management application.

Figure 4:
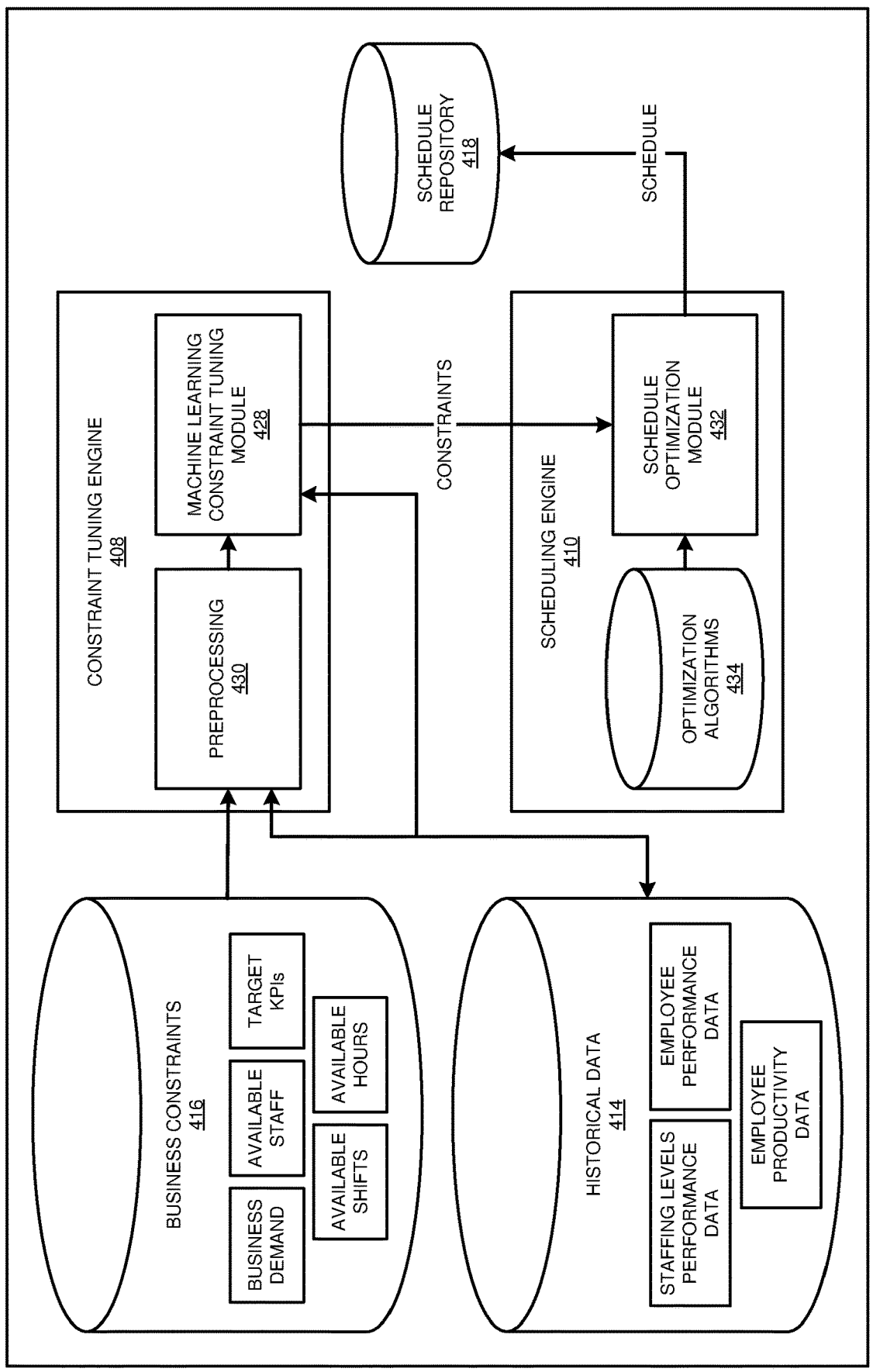
FIG. 4 depicts a more detailed block diagram of an example constraint tuning engine and an example scheduling engine of a schedule management application in accordance with an illustrative embodiment.

With reference to FIG. 4, this figure depicts a more detailed block diagram of an example constraint tuning engine 408 and an example scheduling engine 410 of a schedule management application in accordance with an illustrative embodiment. In a particular embodiment, the constraint tuning engine 408 is an example of constraint tuning engine 308 in FIG. 3. In a particular embodiment, the scheduling engine 410 is an example of the scheduling engine 310 in FIG. 3.

In some embodiments, the constraint tuning engine 408 includes a preprocessing module 430 and a machine learning constraint tuning module 428, and the scheduling engine 410 includes a schedule optimization module 432 and an optimization algorithm database 434. In alternative embodiments, the constraint tuning engine 408 and scheduling engine 410 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the constraint tuning engine 408 receives a schedule request from a user that includes form data from an electronic form populated by the user and, responsive to receiving the request, the schedule management application parses the form data into a plurality of form values. In some such embodiments, constraint tuning engine 408 assembles the form values into a search vector. In some embodiments, the form data includes data regarding one or more employees. In some embodiments, the form data includes data regarding one or more employees in a plurality of geographical regions, office locations, building subdivisions, departments, and/or other groupings. In some embodiments, the form data includes data regarding a demand value representative of a projected business demand during the specified schedule period.

In some embodiments, the preprocessing module 430 receives business constraints from database 416. In some embodiments, the business constraint data 416 includes key performance indicator (KPI) values representative of a target business goal for the specified schedule period. In some embodiments, the business constraint data 416 includes data regarding employee availability, including, for example availability information for employees to work various shifts, locations, or other parameters. In some embodiments, the employee business constraint data 416 includes schedule preference data representative of a schedule preference of one or more employee. For example, in some embodiments, employee business constraint data 416 includes schedule preference data representative of a schedule preferences of employees collected in response to employee surveys.

In some embodiments, the preprocessing module 430 application assembles business constraint data and other data received in connection with the schedule request into a search vector. In some embodiments, the search vector includes a plurality of dimensions corresponding to respective constraints from the data received in connection with the schedule request. In some embodiments, the search vector includes dimensions corresponding to one or more of a business demand, an employee availability, a KPI and/or an employee schedule preference.

In some embodiments, prior to searching the historical data, the preprocessing module 430 preprocesses the historical data in the history database based at least in part on the values in the search vector. In some embodiments, the preprocessing module 430 performs preprocessing that includes one or more preprocessing functions, such as format conversion, amplitude normalization, phase shifting, frequency weighting, blanking, summation, and filtering. For example, in some embodiments, the preprocessing module 430 normalizes the historical data in the history database based at least in part on the form values in the search vector. In some embodiments, the schedule management application structures the historical data in the history database to form a plurality of historical schedule vectors. In some embodiments, the preprocessing module 430 arranges the historical data in the history database into data structures each having a number of dimensions corresponding to dimensions of the search vector.

In an illustrated embodiment, the preprocessing module 430 provides the search vector to the machine learning constraint tuning module 428. In response, the machine learning constraint tuning module 428 searches historical data in a history database 414 for historical data that can be used to optimize constraints for the scheduling engine 410. In some embodiments, the machine learning constraint tuning module 428 uses a nearest neighbor algorithm to search the historical data. In some embodiments, the nearest neighbor algorithm inputs the search vector, identifies a first set of historical vectors comprising a first predetermined number of historical vectors that are closest by Euclidean distance to the search vector, and identifies a second set of historical vectors comprising a second predetermined number of historical vectors that include the first set of historical vectors and are most similar by Euclidean distance to the search vector. In some embodiments, the machine learning constraint tuning module 428 uses locality sensitive hashing for the nearest neighbor search if the number of constraints exceeds a threshold number. For example, in some such embodiments, the machine learning constraint tuning module 428 uses locality sensitive hashing for the nearest neighbor search if the number of constraints exceeds 30. In some embodiments, the machine learning constraint tuning module 428 uses locality sensitive hashing for the nearest neighbor search if the number of constraints exceeds a threshold number at which an amount of time and/or other resources to complete the nearest neighbor search becomes undesirable.

In some embodiments, the machine learning constraint tuning module 428 calculates an enhanced constraint vector comprising an average value based at least in part on the first set of historical vectors and a standard deviation value based at least in part on the second set of historical vectors. As a non-limiting example, in some embodiments, each of the historical vectors in the first set of historical vectors has n vector elements. The machine learning constraint tuning module 428 averages the corresponding vector elements 1 through n of the first set of historical vectors, resulting in a set of n average values. The machine learning constraint tuning module 428 then uses the set of n average values as vector elements 1 through n of the enhanced constraint vector.

In some embodiments, the machine learning constraint tuning module 428 calculates an enhanced constraint vector comprising n average values corresponding to respective averages of elements 1 through n of the first set of historical vectors. In some embodiments, the machine learning constraint tuning module 428 also calculates n standard deviation values. In some embodiments, the machine learning constraint tuning module 428 calculates the n standard deviation values using the second set of historical vectors. In some embodiments, the machine learning constraint tuning module 428 calculates the n standard deviation values using the second set of historical vectors. In some embodiments, the machine learning constraint tuning module 428 calculates the n standard deviation values based on respective values of elements 1 through n of the second set of historical vectors. In some embodiments, the machine learning constraint tuning module 428 applies the n standard deviation values to the n average values such that each of the 1 through n standard deviation values is applied to respective averages 1 through n of the enhanced constraint vector.

In some embodiments, the schedule optimization module 432 generates an employee schedule using an optimization algorithm subject to a plurality of schedule constraints. In some embodiments, the schedule optimization module 432 is trained using training data from algorithm data 434. In some embodiments, the schedule optimization module 432 is trained using historical data 414, for example using historical data representative of schedules and constraints from a past time period, for example from a past month, a past plurality of months, a past year, a past plurality of years, or other time period. In some embodiments, using an optimization algorithm. In some embodiments, the scheduling engine 410 generates an employee schedule using an optimization algorithm subject to a plurality of schedule constraints that include the enhanced constraint vector received from the constraint tuning engine 408. In some embodiments, the scheduling engine 410 generates an employee schedule using an optimization algorithm subject to a plurality of schedule constraints that include the enhanced constraint vector and one or more of a number of employees in each shift, a number of shifts an employee can be assigned, a number of days in the schedule, a number of shifts in a schedule, a number of full-time schedules, a number of part time schedules, an employee that must work the same shift as a supervisor, and rotational weekend information. In some embodiments, the scheduling engine 410 stores the completed schedule in the schedule repository 418, where it can be accessed by other systems.

Figure 5:
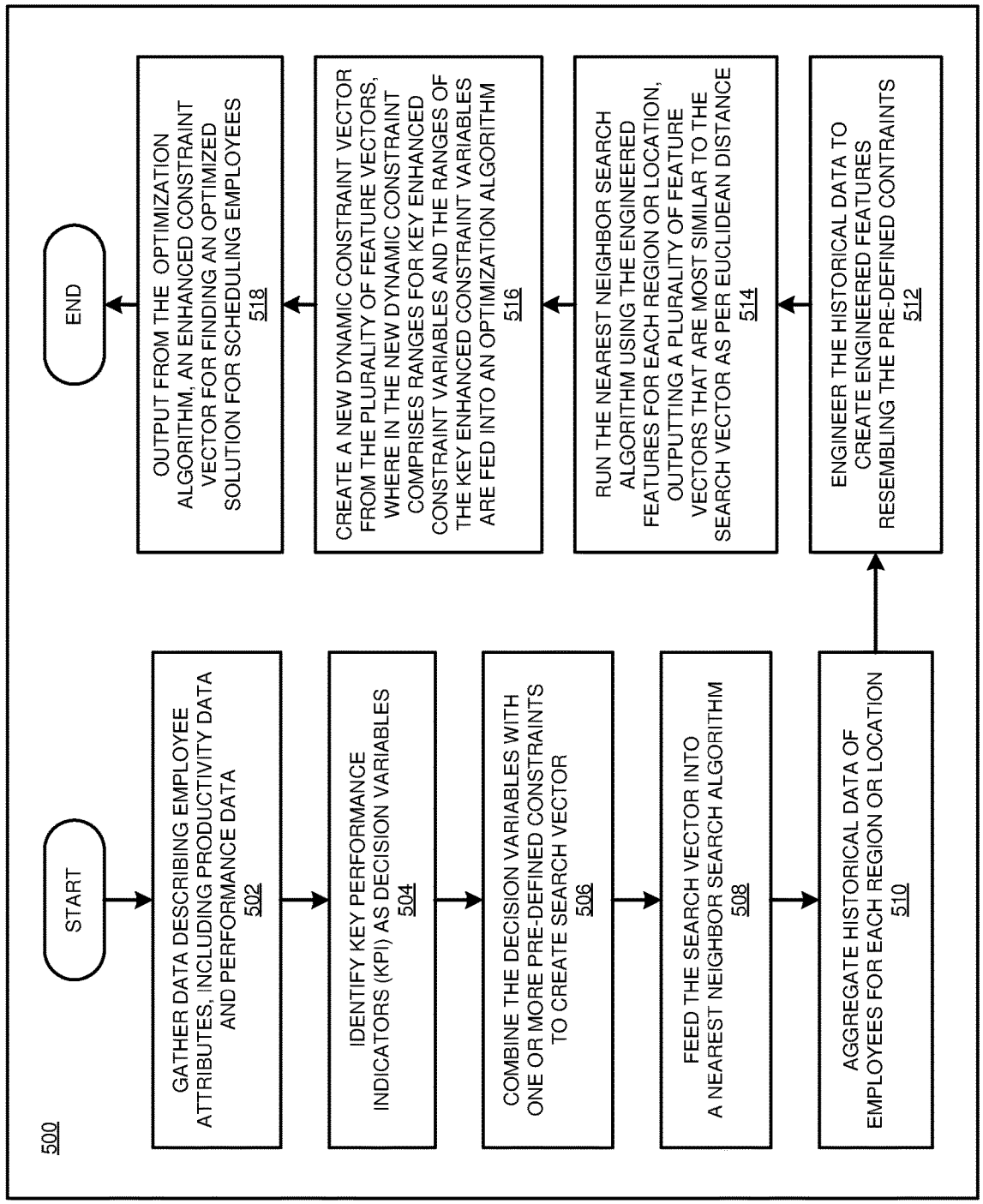
FIG. 5 depicts a flowchart of an example process for cognitive tuning of scheduling constraints in accordance with an illustrative embodiment.

With reference to FIG. 5, this figure depicts a flowchart of an example process 500 for cognitive tuning of scheduling constraints in accordance with an illustrative embodiment. In a particular embodiment, the schedule management application 302 carries out the process 500.

In an embodiment, at block 502, the process gathers data describing employee attributes, including productivity data and performance data. In an embodiment, at block 504, the process identifies key performance indicators (KPI) as decision variables. In an embodiment, at block 506, the process combines the decision variables with one or more pre-defined constraints to create search vector. In an embodiment, at block 508, the process feeds the search vector into a nearest neighbor search algorithm. In an embodiment, at block 510, the process aggregates historical data of employees for each region or location. In an embodiment, at block 512, the process engineers, or restructures, the historical data to create engineered features resembling the pre-defined constraints. In an embodiment, at block 514, the process runs the nearest neighbor search algorithm using the engineered features for each region or location, outputting a plurality of feature vectors that are most similar to the search vector as per Euclidean distance. In an embodiment, at block 516, the process creates a new dynamic constraint vector from the plurality of feature vectors, wherein the new dynamic constraint comprises ranges for key enhanced constraint variables and the ranges of the key enhanced constraint variables are fed into an optimization algorithm. In an embodiment, at block 518, the process outputs from the optimization algorithm, an enhanced constraint vector for finding an optimized solution for scheduling employees.

Figure 6:
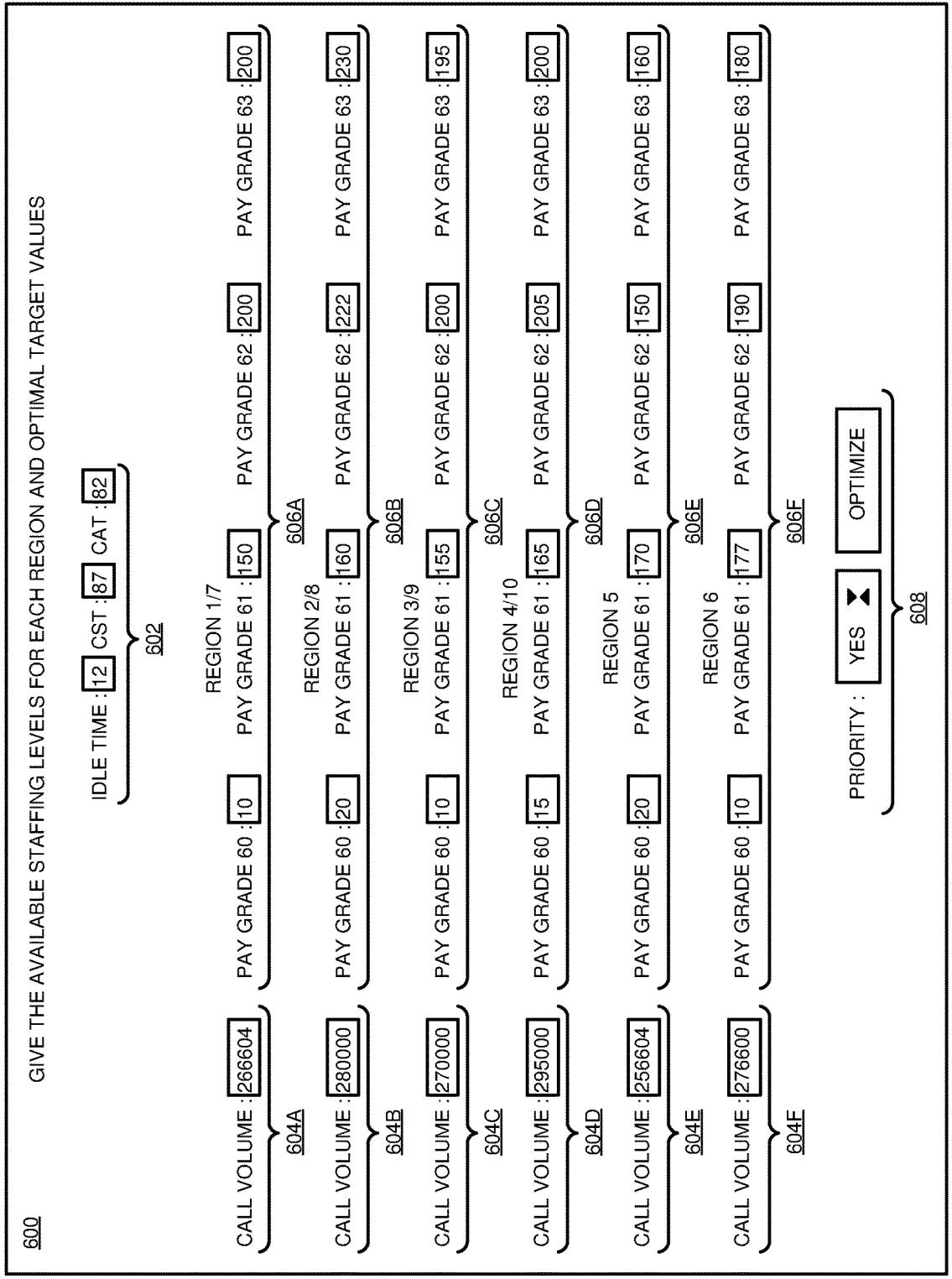
FIG. 6 depicts an example graphical user interface for requesting a schedule in accordance with an illustrative embodiment.

With reference to FIG. 6, this figure depicts an example graphical user interface (GUI) 600 for requesting a schedule in accordance with an illustrative embodiment. In an embodiment the GUI 600 is generated by management interface 306 in FIG. 3.

In some embodiments, the GUI 600 provides an interface that allows a user to submit a schedule request. The GUI 600 includes form input elements 602, 604A-F, 606A-F, and 608 that a user can populate with data that will be submitted as form data to a schedule management application. In the illustrated embodiment, the form elements include input elements 602 for KPI values, input elements 604A-F for demand values for respective regions, input elements 606A-F for employee availability values, and input elements 608 for priority information.

Although depicted as a GUI 600, a schedule management application may receive user input via any number and type of interfaces. For example, in some embodiments, a schedule management application receives user input via command line input, voice input, and the like.

With reference to FIGS. 7-9, these figures depict non-limiting examples of schedule reports output from a schedule management application in accordance with an illustrative embodiment. In an embodiment the management interface 306 includes a display for visually displaying the schedule reports shown in FIGS. 7-9.

FIG. 7 shows a report 700 that incudes statistical details regarding the schedule mix in percentage of employees or associates. FIG. 8 shows a report 800 that incudes recommendations and personnel mix recommendations that have a best chance of achieving provided KPIs and employee preferences. FIG. 9 shows a report 900 that incudes statistical details regarding employee preferences that are met by the generated schedule.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
    parsing, by a processor responsive to a schedule request from a user, form data into a plurality of form values, the schedule request comprising the form data from an electronic form populated by the user;
    assembling, by the processor, the form values into a search vector, wherein the search vector includes a plurality of dimensions, wherein each dimension corresponds to a respective constraint of a set of constraints from the form values;
    structuring historical data in a history database into a plurality of historical vectors, wherein the structuring comprises structuring each of the plurality of historical vectors to include a number of dimensions corresponding to respective dimensions of the search vector;
    optimizing, by the processor, the set of constraints for a machine-learning scheduling algorithm by searching the historical data in the history database, the searching comprising:
        executing, when a number of constraints in the set of constraints is at most a threshold number of constraints, a nearest neighbor algorithm that inputs the search vector, and performing locality sensitive hashing when the number of constraints in the set of constraints exceeds the threshold number of constraints,
        identifying a first set of historical vectors from among the plurality of historical vectors, the first set of historical vectors comprising a first predetermined number of historical vectors that are closest by Euclidean distance to the search vector, and
        identifying a second set of historical vectors from among the plurality of historical vectors, the second set of historical vectors comprising a second predetermined number of historical vectors larger than the first predetermined number of historical vectors that include the first set of historical vectors and are most similar by Euclidean distance to the search vector;
    calculating, by the processor, an enhanced constraint vector comprising a plurality of enhanced constraint values, wherein each enhanced constraint value is determined using an average constraint value of a respective dimension of the first set of historical vectors and a standard deviation value of a respective dimension of the second set of historical vectors;
    generating, by the processor, an employee schedule using an optimization algorithm subject to the set of constraints, wherein the set of constraints comprises the enhanced constraint vector; and
    transmitting, by the processor responsive to the generating of the employee schedule, data for initiating a notification regarding availability of the employee schedule.

2. The computer implemented method of claim 1, wherein the schedule request corresponds to a specified schedule period.

3. The computer implemented method of claim 2, wherein the form values include a demand value representative of a projected business demand during the specified schedule period.

4. The computer implemented method of claim 2, wherein the form values include a key performance indicator (KPI) value representative of a target business goal for the specified schedule period.

5. The computer implemented method of claim 2, wherein the form values include a first number of employees available to work during the specified schedule period.

6. The computer implemented method of claim 5, wherein the form values include a second number of employees available to work during the specified schedule period, wherein the first and second numbers correspond to respective employee categories.

7. The computer implemented method of claim 1, further comprising normalizing the historical data in the history database based at least in part on the form values in the search vector.

8. The computer implemented method of claim 1, further comprising parsing data to extract schedule preference data representative of a schedule preference of an employee, wherein the set of constraints comprises the schedule preference data.

9. A computer usable program product for generating an employee work schedule, the computer program product comprising one or more computer readable storage media, and program instructions collectively stored on the one or more computer readable storage media, the program instructions executable by a processor to cause the processor to perform operations comprising:
    parsing, by the processor responsive to a schedule request from a user, form data into a plurality of form values, the schedule request comprising the form data from an electronic form populated by the user;
    assembling, by the processor, the form values into a search vector, wherein the search vector includes a plurality of dimensions, wherein each dimension corresponds to a respective constraint of a set of constraints from the form values;

structuring historical data in a history database into a plurality of historical vectors, wherein the structuring comprises structuring each of the plurality of historical vectors to include a number of dimensions corresponding to respective dimensions of the search vector;

optimizing, by the processor, the set of constraints for a machine-learning scheduling algorithm by searching the historical data in the history database, the searching comprising:

executing, when a number of constraints in the set of constraints is at most a threshold number of constraints, a nearest neighbor algorithm that inputs the search vector, and performing locality sensitive hashing when the number of constraints in the set of constraints exceeds the threshold number of constraints, identifying a first set of historical vectors from among the plurality of historical vectors, the first set of historical vectors comprising a first predetermined number of historical vectors that are closest by Euclidean distance to the search vector, and identifying a second set of historical vectors from among the plurality of historical vectors, the second set of historical vectors comprising a second predetermined number of historical vectors larger than the first predetermined number of historical vectors that include the first set of historical vectors and are most similar by Euclidean distance to the search vector;

calculating, by the processor, an enhanced constraint vector comprising a plurality of enhanced constraint values, wherein each enhanced constraint value is determined using an average constraint value of a respective dimension of the first set of historical vectors and a standard deviation value of a respective dimension of the second set of historical vectors;

generating, by the processor, an employee schedule using an optimization algorithm subject to the set of constraints, wherein the set of constraints comprises the enhanced constraint vector; and transmitting, by the processor responsive to the generating of the employee schedule, data for initiating a notification regarding availability of the employee schedule.

10. The computer usable program product of claim 9, wherein the schedule request corresponds to a specified schedule period.

11. The computer usable program product of claim 10, wherein the form values include a demand value representative of a projected business demand during the specified schedule period.

12. The computer usable program product of claim 10, wherein the form values include a KPI value representative of a target business goal for the specified schedule period.

13. The computer usable program product of claim 9, wherein the stored program instructions are stored in a computer readable storage device in a data processing system, and wherein the stored program instructions are transferred over a network from a remote data processing system.

14. The computer usable program product of claim 9, wherein the stored program instructions are stored in a computer readable storage device in a server data processing system, and wherein the stored program instructions are downloaded over a network to a remote data processing system for use in a computer readable storage device associated with the remote data processing system, further comprising:

program instructions to meter use of the computer usable code associated with the request; and program instructions to generate an invoice based on the metered use.

15. A computer system comprising a processor and one or more computer readable storage media, and program instructions collectively stored on the one or more computer readable storage media, the program instructions executable by the processor to cause the processor to perform operations comprising:

parsing, by the processor responsive to a schedule request from a user, form data into a plurality of form values, the schedule request comprising the form data from an electronic form populated by the user;

assembling, by the processor, the form values into a search vector, wherein the search vector includes a plurality of dimensions, wherein each dimension corresponds to a respective constraint of a set of constraints from the form values;

structuring historical data in a history database into a plurality of historical vectors, wherein the structuring comprises structuring each of the plurality of historical vectors to include a number of dimensions corresponding to respective dimensions of the search vector;

optimizing, by the processor, the set of constraints for a machine-learning scheduling algorithm by searching the historical data in the history database, the searching comprising:

executing, when a number of constraints in the set of constraints is at most a threshold number of constraints, a nearest neighbor algorithm that inputs the search vector, and performing locality sensitive hashing when the number of constraints in the set of constraints exceeds the threshold number of constraints, identifying a first set of historical vectors from among the plurality of historical vectors, the first set of historical vectors comprising a first predetermined number of historical vectors that are closest by Euclidean distance to the search vector, and identifying a second set of historical vectors from among the plurality of historical vectors, the second set of historical vectors comprising a second predetermined number of historical vectors larger than the first predetermined number of historical vectors that include the first set of historical vectors and are most similar by Euclidean distance to the search vector;

calculating, by the processor, an enhanced constraint vector comprising a plurality of enhanced constraint values, wherein each enhanced constraint value is determined using an average constraint value of a respective dimension of the first set of historical vectors and a standard deviation value of a respective dimension of the second set of historical vectors;

generating, by the processor, an employee schedule using an optimization algorithm subject to the set of constraints, wherein the set of constraints comprises the enhanced constraint vector; and transmitting, by the processor responsive to the generating of the employee schedule, data for initiating a notification regarding availability of the employee schedule.

16. The computer system of claim 15, wherein the schedule request corresponds to a specified schedule period.

17. The computer system of claim 16, wherein the form values include a demand value representative of a projected business demand during the specified schedule period.

18. The computer system of claim 16, wherein the form values include a KPI value representative of a target business goal for the specified schedule period.

* * * * *